United States Patent [19]

Barber

[11] 4,329,191

[45] * May 11, 1982

[54] SYSTEM FOR ALPHABETICALLY LABELLING ARTICLES

[75] Inventor: Donald T. Barber, Toronto, Canada

[73] Assignee: Datafile Limited, Willowdale, Canada

[*] Notice: The portion of the term of this patent subsequent to Dec. 23, 1997, has been disclaimed.

[21] Appl. No.: 200,517

[22] Filed: Oct. 24, 1980

Related U.S. Application Data

[63] Continuation-in-part of Ser. No. 922,187, Jul. 5, 1978, Pat. No. 4,240,848.

[51] Int. Cl.³ ........................ B32B 31/10; B65C 1/04; G09F 3/02
[52] U.S. Cl. ..................................... 156/64; 40/23A; 156/216; 156/277; 156/350; 156/351; 156/379; 156/384; 156/475; 156/DIG. 3; 156/DIG. 46; 156/DIG. 47; 206/459; 250/566; 250/571; 283/21; 283/36
[58] Field of Search ................. 40/23 A; 156/64, 216, 156/277, 350, 351, 379, 384, 475, DIG. 3, DIG. 46, DIG. 47; 206/459; 270/5, 8; 283/21, 36; 250/566, 571

[56] References Cited

U.S. PATENT DOCUMENTS

| 2,631,845 | 3/1953 | Zuckerman | 270/5 |
| 3,001,306 | 9/1961 | Wilkinson | 40/2 R |
| 3,567,909 | 3/1971 | Allen | 250/219 X |
| 3,691,662 | 9/1972 | Cunningham | 40/23 A |
| 3,760,161 | 9/1973 | Lohne et al. | 235/61.11 E |
| 3,801,408 | 4/1974 | Kuring et al. | 156/552 |
| 3,924,744 | 12/1975 | Heimann | 206/460 |
| 3,937,493 | 2/1976 | Fasbender | 40/23 A |
| 3,946,507 | 3/1976 | Fergg et al. | 40/2 R |
| 3,949,363 | 4/1976 | Holm | 235/462 X |
| 4,050,719 | 9/1977 | Cunningham | 283/36 |
| 4,183,779 | 1/1980 | Barber et al. | 156/361 |
| 4,204,639 | 5/1980 | Barber et al. | 40/2 R X |
| 4,240,848 | 12/1980 | Barber | 156/64 |

FOREIGN PATENT DOCUMENTS 843183 6/1970 Canada .
925764 5/1973 Canada .

*Primary Examiner*—Edward C. Kimlin
*Assistant Examiner*—Robert A. Dawson

[57] ABSTRACT

A process for labelling a system of file folders comprises printing a label for the system, where each printed label is different from other printed labels for the system. Each label has a field in which a set of indicia is printed, where the indicia are both machine and visually readable. The printed indicia is machine read for directing a labeler's application to a file folder flap of individual color coded labels. Each color coded label, as applied, has an indicium corresponding to one of the machine read indicium.

10 Claims, 6 Drawing Figures

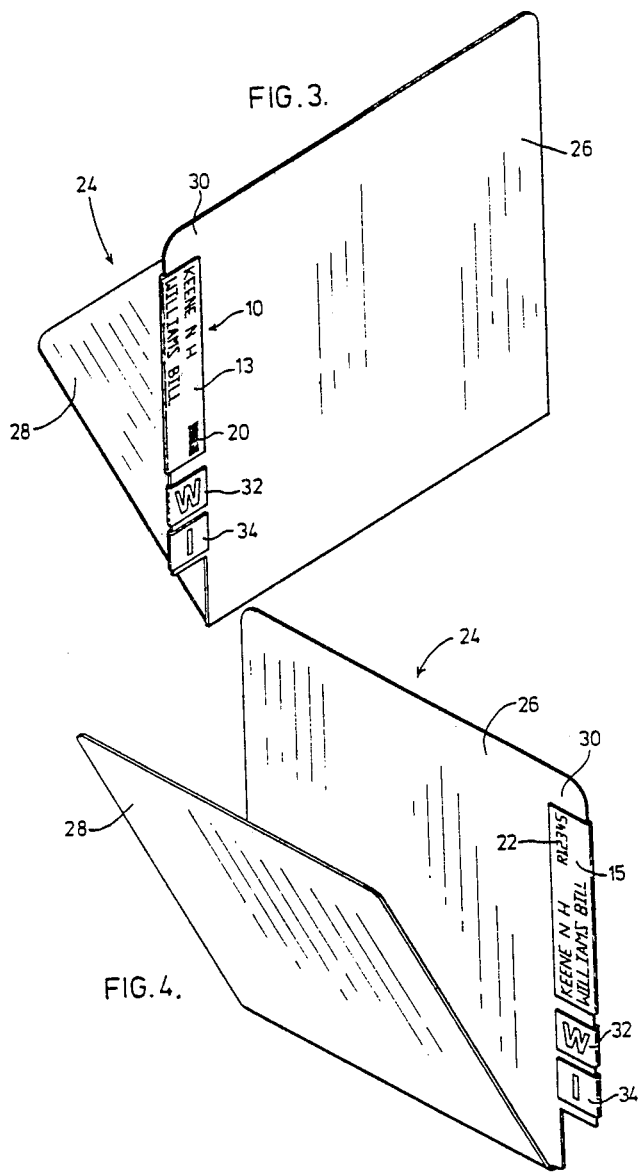

SYSTEM FOR ALPHABETICALLY LABELLING ARTICLES

This is a continuation-in-part application of U.S. application Ser. No. 922,187, filed July 5, 1978 and now U.S. Pat. No. 4,240,848.

FIELD OF THE INVENTION

This invention relates to a process for labelling file folder systems and to printing labels for folders.

BACKGROUND OF THE INVENTION

Broadly speaking there are two ways to file correspondence and other documents in offices. One way is in folders placed in drawer files; and the other way is in folders placed on shelf files. The drawer file system is a standard adopted by many business and government offices. In recent years, however, there has been a distinct trend away from drawer files to shelf files. Shelf files have several worthwhile advantages. There is the saving of space, because shelf files can go higher in view of reaching up to folders on shelves instead of having to reach over the top of the drawer to retrieve files from drawers. The drawers must be pulled out into an aisle, thus requiring wider aisles between rows. Usually there is a 30% space saving when changing from drawer files to shelf files. The shelf files eliminate the need to pull drawers out or push them in so that little physical effort is expended in withdrawing files from the shelf system and since all files are visible, access to them is fast and direct. In shelf filing systems, the file room is more compact so that there is less walking.

With the shelf filing system, the folder used is that commonly referred to as "End Tab" or "Side Tab" folder to distinguish it from the "Top Tab" folder used in drawer files. The end referred to is the edge of the folder that is visible when folders are positioned on a shelf. End tab folders may have the tab in several positions; for example, four inch top tab, four inch bottom tab, and full end tab.

There are three principal systems or classes of coding files; that is, by the use of reference numbers, by the use of the alphabetic names or subjects, or a combination of both numeric and alphabetic.

Computers are being used for file room control where the file whereabouts is recorded and stored in computer memory. This is presently accomplished by keyboard entry of file reference numbers and its whereabouts is recorded in the computer memory. Such a system is subject to error and requires a great deal of time and a number of keypunch operators in the file room and at other locations throughout the office to record file "pass-ons".

The labelling of file folders is usually based on a name, subject or number in association with which the file is opened. The label for the file may show the person's name or the identity of the company, government office, etc. together with location such as City and Province or State and with subject files the main classification and sub-classification. Two such labels are usually printed in a typewriter and subsequently applied to both sides of the end tab folder. That system of alphabetic labelling of files requires considerable manual input and is slow and cumbersome.

Canadian Pat. No. 925,764 shows a label for a file folder flap. The label is one-sided and has printed thereon a name and two colour coded areas which are representative of the first two initials of the surname. However, no consideration is given in that patent to the machine reading of information set out on the label and using such machine read information to control a labeller's application of subsequent labels to the same file folder. U.S. Pat. No. 3,949,363 discloses various types of bar code, magnetic ink character recognition and optical character recognition printing used on cheques and the like. The particulars of the coded information may be read from the cheque; however, there is no discussion about using read information to control a labeller application of additional labels to a file folder.

The process, according to this invention, overcomes a number of the above problems to provide a label which not only permits identification of the article, but also permits machine reading of information from the labels. In this reading of the information, a labeller may be programmed, in accordance with input of the read information, to apply other labels to the same file folder. Such additional labels may be of the colour coded type to provide all the attendant advantages thereof, as defined in applicant's U.S. Pat. No. 4,204,639.

SUMMARY OF THE INVENTION

A process for labelling a system of file folders comprises printing a set of indicia in a field on a label face. The printed indicia are each both machine and visually readable, where such printed indicia is machine read. A labeller's application of labels to a file folder flap is controlled by input from such machine reading step in the application of individual colour coded labels to the file folder flap. Each colour coded label, as applied, has an indicium corresponding to one of the machine read indicia.

The produced article, therefore, has a label identifying the subject matter of the article with one or more individual labels having letters or numbers corresponding to, for example, the first two letters of the person's name associated with the file, or a portion of the person's associated numeric information. This provides ready access to an article in shelf filing systems where the individual labels having the letters may be colour coded to provide bands of colours along the filing system, so that an article or a small group of articles may be visually recognizable from other articles in the system due to the combination of colour coded labels.

BRIEF DESCRIPTION OF THE DRAWINGS

Preferred embodiments of the invention are shown in the drawings wherein:

FIG. 3 is a view from one side of a file folder panel;

FIG. 4 is a view from the other side of the file folder panel of FIG. 3;

DETAILED DESCRIPTION OF THE PREFERRED EMBODIMENTS

Figure 1:
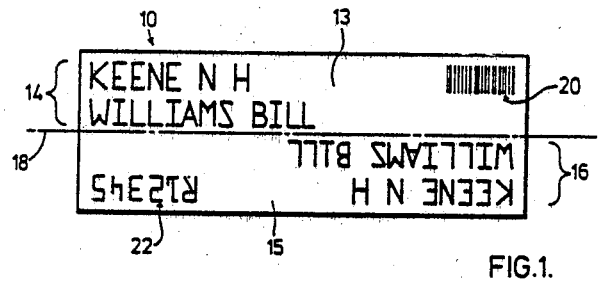
FIG. 1 is a view of a label according to a preferred embodiment of the invention.

FIG. 1 shows a label printed in a manner according to one of the preferred embodiments of this invention. The label 10 is rectangular in shape. On a portion of a first field or its face 12, it has a first set of indicia encompassed by bracket 14. On the outer line, the name of the City and State, Keene, N.H., is printed. On the first line adjacent the central portion of the label 10, the name of the person, Williams, Bill, in association with which a file folder has been opened, is printed. The second set of indicia, which is encompassed by bracket 16, is identical to and printed in rows parallel to the rows of the first set of indicia 14. The second set of indicia is printed upside down and backwards relative to the first set of indicia.

In locating the two sets of indicia in the manner shown in FIG. 1, they are positioned in upper and lower fields as identified on each side of an imaginary fold line shown in dot and designated 18. The two fields extend the length of label 10 and, in this particular embodiment, they are beside one another and are co-extensive with each other. In the upper right-hand corner of the label's first field 13, the machine readable indicium bar code 20 represents the first two initials WI of the person's name. The code is shown in "Code 39" bar code format including start/stop portions and intermediate portions indicating and representative of, when machine read, the designated preselected letters WI. In the lower left-hand corner of the label's second field 15, a machine readable code 22, in this embodiment made up of optical character recognition markings, represents the subject matter of the label and, therefore, the subject matter of the article to which the label is to be applied. The code 22 is read during charge out of, for example, file folders in the control of the file room.

The label 10, when used on a file folder, is preferably coated with a protective layer of material which may be laid over the label after printing. The protective material may be of a thin transparent sheet with an adhesive backing, such as a sheet of "Mylar" (trademark), which adheres to the surface of the label. To assist in the application of a label to an article, the back of the label may have an adhesive material applied thereto which is pressure sensitive. During the printing and handling of the label, it may have a protective backing. The backing is peeled therefrom to expose the adhesive for application of the label to an article. In applying the label as mentioned, it may be folded along line 18 extending the label's length to isolate fields 13 and 15.

The label 10, as shown in FIG. 3, is applied to an end tab of a file folder generally designated 24 having file folder flaps 26 and 28. The end tab of the folder 24 juts outwardly of flap 26 in the form of tab 30 which is integral with flap 26. Label 10, as folded about imaginary line 18, is applied to the folder so that when read from its rearside, the first set of indicia 14 is readily read. As shown in FIG. 4, the second set of indicia 16 is readily read from the other side of the file. This facilitates file folder reference from either direction when looking for files in shelf filing systems.

The bar code 20 on label 10, as mentioned, designates the initials WI of the name and controls the labelling machine application of singular filing code labels 32 and 34. As can be seen in FIGS. 3 and 4, labels 32 and 34 have the initials repeated on each side of its central fold to provide reference to the file from either side. The labels may be colour coded and of the type described in applicant's U.S. Pat. No. 4,204,639.

The label 10 may, according to a preferred embodiment of the invention, be printed in a single operation. As the printer passes along relative to the label 10 from left to right, vertical segments of both rows of first set of indicia 14 are simultaneously printed. On moving across the label 10, the first indicium "L" of the second set is printed upside down and reverse order in line with the indicium "L" of the first set. Similarly, as the first set of indicia 14 is being printed, the code 22 is also being printed in its upside down and reverse order manner directly below and in line with the upper indicium columns. The bar code 20 is printed as the second set of indicia 16 is being printed. The process, therefore, prints the entire label in a single pass.

An apparatus, which has been found to be particularly suitable for this type of printing operation, is that sold by Markham Corporation of Keene, N.H., and sold under the trademark "Scanmark". This printer, model U.1235, has been modified to print two rows of indicia in a upright manner and two underlying rows of indicia in an upside down manner. This device, as it has been modified, has the capacity to type four lines of the label in the following manner. A constantly revolving cylinder has four lines of type embossed on the surface. The cylinder is positioned vertically. The lines of type are positioned horizontally around the cylinder so that they print the four lines of typing required to produce the combined label 10. The top two lines are embossed on the cylinder in their standard upright position and the bottom two lines are embossed upside down and backwards. For example, the A on the second line of embossed type would be in perpendicular alignment with the A on the first line. On the third line of embossed type, the A would also be in perpendicular alignment, but would be upside down. The fourth line of type would be identical to the third. All the alphabet letters A through Z and the numbers 0 through 9 with special characters such as bar code would be on the drum. The bar code type may be that well known in the field as "Code 39". The letters A through Z and 0 through 9 may be in machine readable optical character recognition (OCR) format or magnetic ink character recognition (MICR). This permits printing of machine readable sets of indicia and code 22.

The Markham printer has been designed so that the rolls of self-adhesive labels attached to the backing paper are fed across the cylinder. In front of the label, a one-time carbon-like ribbon is also fed across the cylinder. The labels and the one-time carbon-like material are pulled past the cylinder by the action of a stepper motor in an intermittent start/stop movement. Four hammers on the printer are timed to strike the four lines of embossed letters on the constantly revolving cylinder. The label and carbon-like ribbon are held in position until the printing requirements of all four lines of type have been met. The printing sequence for each label is stored in the buffer memory of the printer. This buffer memory for each label is programmed from the keyboard of the Markem printer or alternately from a computer generated magnetic tape by a tape device such as a "Mitron" (trademark) MDRS-9 Unit. This is distributed by Mitron Systems Corporation of Columbia, Md. The embossed cylinder is kept at a constant high temperature, so that when the hammer strikes the carbon-like paper, there is an actual transfer of carbon-like coating to the label. Thus printed in this hotstamp-like process, the carbon-like material is permanently bonded to the paper. As mentioned, when the label is used on the files in other fields where permanence is required, the label may be laminated with a transparent film of "Mylar" to protect the label from wear.

Use of the Markham printer or similar device, therefore, provides in a single pass on the label the printing of both sets of indicia and machine readable codes. It is understood, however, that the label 10 may also be prepared where the upper half is typed and the label withdrawn from the printing unit inverted or turned upside down and then the second half of the material printed.

Figure 2:
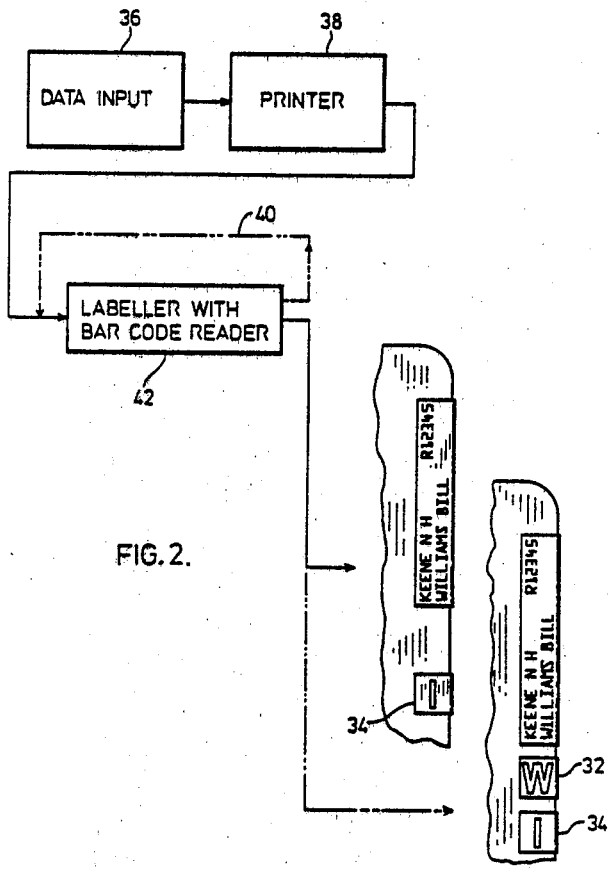
FIG. 2 is a block diagram of the components of the system for labelling of files according to a preferred embodiment where segments of the file folder tab have the file labels built up thereon.

Turning to FIG. 2 according to a preferred embodiment, the aforementioned Mitron System MDRS-9 is used for data input designated by block 36 to direct the printer 38 which, according to a preferred embodiment, is the above-discussed modified "Scanmark" printer. The memory of the data input terminal 36 may include on a magnetic tape or disc a listing of several clients by name, address and other pertinent information which may be included in the sets of indicia to be printed. The printer 38 is activated and, on receiving input from the data bank 36, commences printing the two sets of indicia together with code 22. The printer is programmed to determine the coded indicia from the input and prints bar code 20 to represent the first two initials of the person's name. On completion of the printing of the label, the printed labels may remain on the paper backing and rerolled.

The label application can be mechanized by the use of an automatic labeller, such as the unit described in applicant's U.S. Pat. No. 4,183,779. The roll of printed labels are loaded on the machine or labeller designated by block 42. The labeller applies the labels 10 to the files to place the label on the file tab 30. Before, during or after the label is applied to its folder, the label is machine read to determine what indicia were coded. The labeller 42 has a supply of filing code labels which are on separate rolls, each roll having labels of a particular letter of the alphabet. The bar code reader is adapted to signal the labeller controller whereby it programs such input and directs the application of labels having the coded indicia on the file folder. To decrease the number of label applying stations on labeller 42, the alphabet may be divided in two. In the folder's first past through the labeller, the printed label 10 and any of the coded letters of the Group A through M are applied at their proper positions as shown in FIG. 3a. On the second pass through the labeller, as represented by dotted line 40, the bar code is read again and any of the remaining coded letters of the group N through Z are applied at their proper position as shown in FIG. 3b.

The labeller 42 can be programmed such that it positions the labels 32 and 34 in their respective positions, as determined by input from the reader on the read sequence of the letters as they are coded in the bar code 20.

This automatic labelling process provides a totally mechanized system for labelling files, where each file tab has a label 10 indicating visually and in machine readable form the subject matter of the file. Together with colour coded labels 32 and 34, a shelf filing system provides an advanced form of file reference in the art of colour coding of files, as discussed in applicant's aforementioned U.S. Pat. No. 4,204,639.

It is appreciated that this description of one preferred embodiment of the invention is not intended to be restrictive of the kind of labels that may be produced in the manner described. For example, if the address is not needed, only the two centre lines of the embossed type would be activated on the Markham printer, in which case, the top and bottom lines of the type in label 10 would be eliminated.

Another variation of the labelling of alphabetic folders is for subject filing applications having primary subject classification, secondary classification and tertiary classification. The printer may be provided with alternate programming buffered memory and an alternate embossed cylinder with the top three lines of embossed type right side up and the bottom line upside down. The top printing position of the label would print the primary classification, the second printing position print the secondary classification and the third printing position on the drum, print the tertiary classification. The label would be applied to the folder with only the fourth line showing on the back of the folder, with the primary, secondary and tertiary classifications in a first field and other tertiary classification in a second field, so that the label is folded about its length offset from its centre.

A further variation of the label shown is to provide a narrow colour band along the fold area 18 of the label 10. When such a label is applied to a file folder tab, the colour bar provides colour identification of the folder when viewed from its end. This is particularly useful in large filing systems where mistakes are readily visually noticed. Due to wraparound feature of the label as applied to a folder tab, the colour band is not damaged, nor removed, nor dislocated during handling of the folder.

Figure 5:
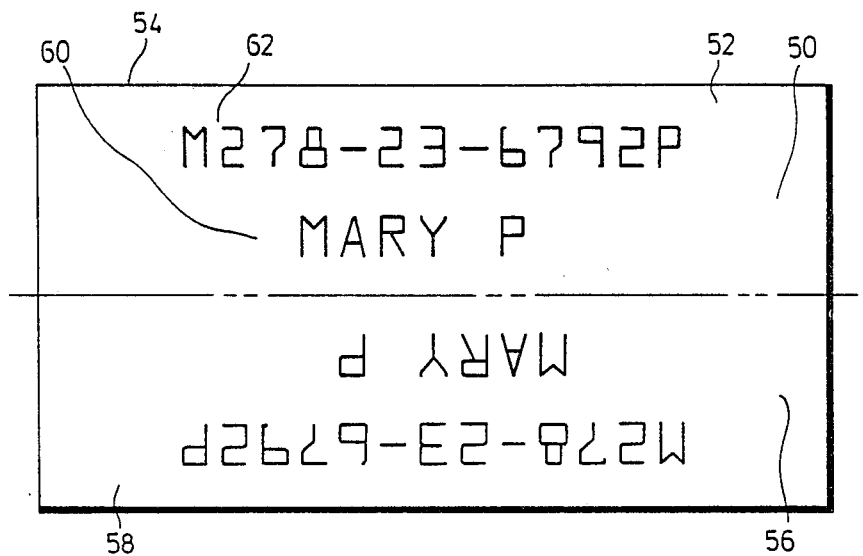
FIG. 5 is a view of another embodiment of a label according to the invention.

As mentioned, the sets of indicia may be printed in machine readable form, such as OCR. Referring to FIG. 5 of the drawings, the first set of indicia 50 is printed in a first field 52 of a label 54. The first set of indicia 50 is printed in OCR format which enables both visual and machine reading of each indicium of the set. As with the other labels, the second set of indicium 56 may be printed in a second field 58 in an upside down backwards manner relative to the first set.

For purposes of file room control, instead of using a machine readable code 22, such as on the label of FIG. 1, the needed information may be taken directly from the first set of indicia 50 of the label by simply reading the person's name 60 or a numerical code 62 which accompanies the person's name. For that matter, both sets of information may be machine read if needed. Thus, in control of the file room, the printed label may be directly machine read without the addition of any further characterizing code to provide for the computer control of the file room in the manner previously discussed. Also, with the printing of label 54, it may be printed in the same way as the label of FIG. 1, where pertinent information is printed in both fields, one set upside down and backwards relative to the other.

The machine readable information may also be read in controlling a labeller's application of subsequent labels to a file folder. As with the process of FIG. 2, the label 54 may have its numeric code 62, or the name 60, machine read and, according to the labeller's program, extract from input of the machine read information the pertinent data for purposes of application of additional labels in the colour coding of the file folder. With the label shown in FIG. 5, the numbers 6, 7, 9, 2 may be selected and colour coded to provide along the file edge, colour coded numeric labels 6, 7, 9 and 2 which are each individual of the other and may be of the type disclosed in applicant's U.S. Pat. No. 4,204,639.

In following the above approach for numerically colour coding a file folder which includes alphabetic listing of the subject matter on the main label, it results in a combination alphabetic/numeric filing system for folders. In large file systems involving thousands and perhaps hundreds of thousands of folders relating to individual people, a label, such as that shown in FIG. 5, may be prepared where the person's name is printed along with a numerical code, where a section of the numerical code is totally random such as the number 6, 7, 9, 2, for that particular person. Thus in systems involving hundreds of thousands of files, there may be ten or twenty files having the same randomly selected number 6, 7, 9, 2. However, in the sub-group the files, as numerically colour coded, may be alphabetically arranged. Therefore, in attempting to find a file in a system, one initially searches by number and then once locating the sub-group searches by the person's name in alphabetical order. This combined approach of numeric/alphabetic filing coding is superior to a straight alphabetic or numeric system, since it narrows down the search more quickly. For example, with an alphabetic system, there may be in a system of 100,000 or more groups 50 to 100 Jones. Thus, in an alphabetic system it would be time consuming to search out one file of all the Jones files. As to a numeric system, for hundreds of thousands of file folders, the numeric order is quite large, thus requiring more complex numeric colour coding than would be used in this particular random four number combination numeric/alphabetical system.

On the other hand, if it is desired to code the file alphabetically, the first two initials MA may be selected from the machine read name to thus, control application according to the labeller's program of the letters MA in colour coded format to the folder edge.

In using such printed labels having machine readable information, this avoids the use of computer cards and the like to direct a random application of labels to files for purposes of coding the file folders in the numeric or alphabetical arrangement. The labels, as printed, may be rolled. The roll of labels may then be unrolled, read, input to the labeller to control application of colour coded labels and then rerolled. On the other hand, the read label may be applied to the folder. In its application to the folder, the label may be read either before it is applied to the folder or afterwards depending upon the particular type of labeller used and its ability to respond quickly to the reading of the machine readable indicia. For example, in instances where it is desired to immediately apply the label to the folder which is to also receive colour coded labels, the printed labels may be set up on the first of several labellers. As the printed label is being applied or just before it is applied, the machine readable information may be read, input to the controller for the labeller and, according to its program, make a selection of the numbers or letters to be applied by the remaining labellers downstream of the first labeller.

Figure 6:
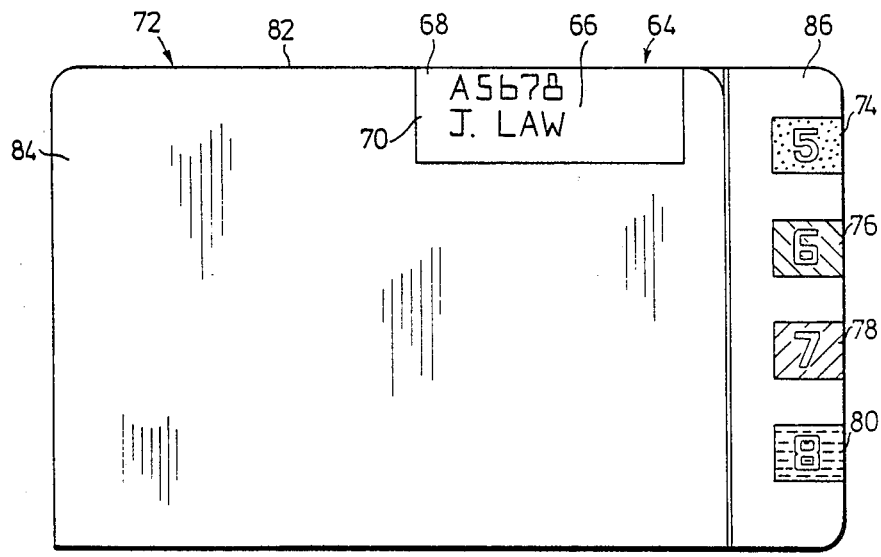
FIG. 6 is a view of another embodiment of the invention illustrating labels applied in another manner.

Referring to FIG. 6, a further variation in the application of labels, according to this invention is illustrated. A printed label 64 has been prepared where in its single field 66, a first row of indicia 68 and a second indicia 70 have been printed. As illustrated, both rows of indicia are printed in OCR format and may be printed in a manner similar to a label 50 where in this instance for label 64, there is only a single face. For a filing system, several of these labels may be prepared where each label is peculiar to its own data and is different from all other labels. Such labels may be rerolled after printing and then used in a manner similar to the other printed labels for directing a computerized labeller in the application of numeric label to a file folder.

As shown, the labels, as printed, may be unrolled and each of them machine read where input of the machine read information to the labeller controller directs the application of colour coded numerical labels 5, 6, 7, and 8 in the manner shown. The printed label 64 may be rerolled, since with the type of labeller as disclosed in applicant's U.S. Pat. No. 4,183,779, the direction of movement of the file folder 72 is such to apply the individual colour coded labels 74, 76, 78 and 80. Therefore, the application of label 64 to the upper edge 82 of flap 84 would be impossible. Thus, the folder 72 is taken from the labeller which has applied labels 74 through 80 and moved to another station where label 64 may be applied. Of course, the files, as they come off the first labeller, may be kept in order and subsequently placed on another labelling machine adapted to apply the printed label to the front face of flap 84 along upper edge 82. The arrangement of FIG. 6 is particularly useful where the edge flap 86 of the file folder is needed to accommodate several labels, or it may be a situation where the file folders are filed such that the label to be read is visual along the upper edge of folder flap 84. In any event, the printed label 64 is used to control, by machine reading the indicia thereon, the application of numeric labels to edge portion 84 of the file folder 72.

Thus, the process of the invention provides the use of a label to direct application of other labels onto the folder in a simple economic manner which affords application of random arrangements of labels to file folders.

Preferred embodiments of the invention have been described herein in detail. It will be understood by those skilled in the art that variations may be made thereto without departing from the spirit of the invention or the scope of the appended claims.

The embodiments of the invention in which an exclusive property or privilege is claimed are defined as follows:

1. A process for labelling a system of file folders comprising printing labels for the system where each printed label is different from other printed labels for the system, each label having a field in which a set of indicia is printed where the indicia are both machine and visually readable, machine reading such printed indicia and controlling by input from such reading step a labeller's application to a file folder flap of individual colour coded labels, each colour coded label, as applied, having an indicium corresponding to selected ones of the machine read indicium.

2. A process of claim 1, wherein said indicia are in optical character recognition format.

3. A process of claim 1, wherein each said printed label is machine read prior to applying such label to a file folder flap.

4. A process of claim 1, wherein each said printed label is machine read after applying such label to a file folder flap.

5. A process of claim 1, wherein each label has first and second fields extending its length, printing a first set of such machine and visually readable indicia in said first field and printing a second set of such machine and visually readable indicia in said second field where said second set is printed backwards and upside down relative to said first set, machine reading either said first or second set of indicia to control said application of colour coded labels.

6. A process of claim 5, wherein said printed label is applied to a folder flap by folding and locating it on such flap with said first label field located on one side of such flap and said second label field located on the other side, each set of indicia having been printed to appear upright in its respective field with said label folded along a fold line between said field as applied to such flap.

7. A process of claim 1, wherein prior to applying such printed label to a folder flap, applying a thin transparent protective coating on such printed label to cover and protect the label print.

8. A process of claim 1, wherein said printed indicia includes machine readable numbers, the machine reading of such printed numbers controlling the application of colour coded numeric labels to a folder in a sequence determined by their printed sequence.

9. A process of claim 1, wherein said printed indicia includes machine readable letters, the machine reading of such printed letters controlling the application of colour coded alphabetic labels to a folder in a sequence determined by the sequence they are printed in said field.

10. A process of claim 1, wherein a plurality of such printed labels are in rolled form, unrolling such roll of printed labels, machine reading each label to control the labeller's application of colour coded labels to each file folder and rerolling the machine read printed labels for subsequent application to the respective colour coded labelled file folder.

* * * * *